and Patent Office 2,890,937
Patented June 16, 1959

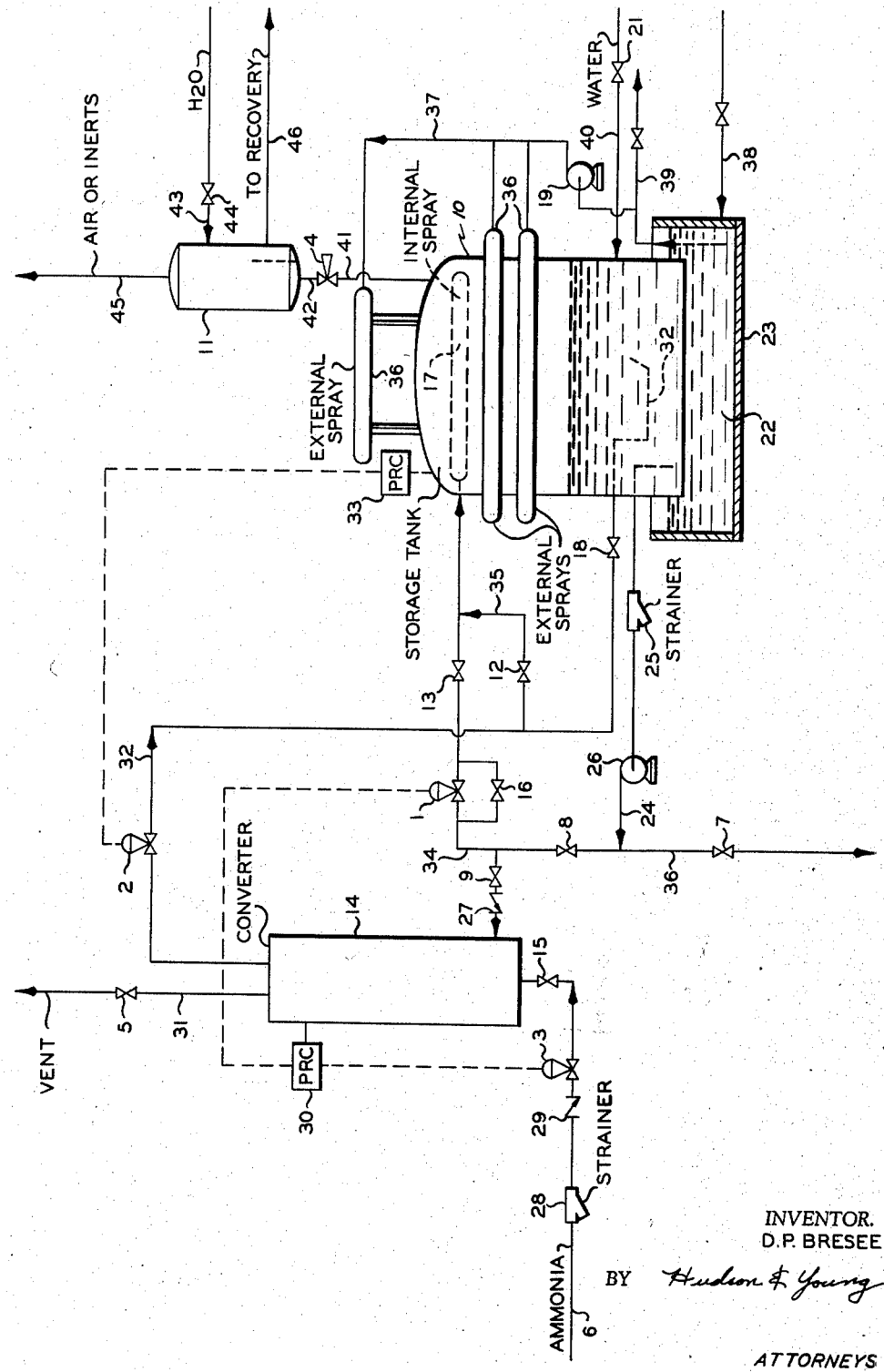

2,890,937

METHOD AND APPARATUS FOR PRODUCTION OF AQUA AMMONIA

Dick P. Bresee, St. Louis, Mo., assignor to Phillips Petroleum Company, a corporation of Delaware Application April 29, 1957, Serial No. 655,584

11 Claims. (Cl. 23—193)

This invention relates to apparatus and to a method for the production of aqua ammonia. In one aspect, it relates to a method and apparatus for control of a process for the production of aqua ammonia from anhydrous ammonia and water.

My invention has particular application in the liquid fertilizer field in which anhydrous ammonia is mixed with water to produce aqueous ammonia. In the production of aqueous ammonia, considerable quantities of heat are evolved and the aqueous solution containing free ammonia should be maintained at as low a temperature as possible to avoid loss of ammonia during handling of the products, and to make possible the employment of low pressure equipment and vessels.

The production of aqua ammonia from water and anhydrous ammonia in large commercial plants exhibits few cooling problems because the supply of ample cooling and refrigeration is ordinarily available. However, in case a dealer wishes to stock anhydrous ammonia separately and then produce aqua ammonia as needed, the problem of refrigerating or cooling the aqueous ammonia is a real one. Ordinarily, under this latter type of operation, plant type refrigeration is not available, nor is the capital investment to construct it warranted.

An object of my invention is to provide a process for producing aqua ammonia in a sufficiently cooled condition for storage and handling in low pressure equipment.

Another object of my invention is to provide a method and apparatus for control of such a process.

Yet another object of my invention is to provide an apparatus in which to produce aqueous ammonia from anhydrous ammonia and water in a sufficiently cooled condition for storage and handling.

Another object of my invention is to provide such an apparatus which requires only a low capital investment for construction and low maintenance costs.

Still other objects, as well as advantages and aspects, of my invention will become apparent upon reading the accompanying disclosure and description of the drawing which forms a part of the specification.

According to my invention, I have provided a process whereby a low pressure tank can be employed for making and cooling aqua ammonia without the development of excessive pressures in said tank and without employing elaborate heat exchange equipment which comprises mixing a stream of water in a first stage from a tank with ammonia in a zone outside said tank, flowing the resulting hot aqua ammonia into the vapor space of said tank and down its wall in a film in indirect heat exchange with a film of cool water on the outside wall of said tank into the body of water in said tank to form a body of aqua ammonia; and switching the flow of said hot aqua ammonia directly into the body of aqua ammonia in the tank while simultaneously flowing a stream of aqua ammonia from the body of same into the vapor space of the tank and down its walls in a film in indirect heat exchange with the film of cool water, thereby cooling the contents of said tank and avoiding excessive vapor pressures therein.

Broadly, the apparatus of my invention comprises a liquid ammonia converter and cooling system which comprises, in combination, a tank, a converter for reacting ammonia and water, a first conduit communicating said converter and said tank, a pump in said first conduit adapted to pump from said tank, a second conduit communicating a point of said first conduit intermediate said converter and said pump with a first spray means in the upper portion of said tank, a third conduit communicating said converter and the lower portion of said tank, a first valve means in said second conduit, a fourth conduit communicating said third conduit and a point in said second conduit intermediate said first spray means and said first valve means, a second valve means in said fourth conduit, a third valve means in said third conduit intermediate said tank and said fourth conduit, and second spray means adapted to spray liquid against the outside of the said tank.

Other features of my invention, including control features, will become apparent from the description of the drawing, which is a diagrammatic representation of the process and apparatus of the invention.

Vessel 10 is a low pressure storage tank which has been pressure tested at about 7 pounds to 10 pounds gauge pressure and can, of course, be a higher pressure vessel, but the present invention makes the employment of vessels tested for more than about 7 p.s.i.g. pressure unnecessary. The tank may suitably be made of steel, but other materials resistant to the action of aqua ammonia are satisfactory. A body of water 22 surrounds the bottom portion of tank 10 and is disposed in a tank 23. Converter 14 is any suitable high pressure vessel for mixing two fluids, and is usually tested for pressures of about 100 p.s.i.g. or more. It may be simply an enlarged mixing T, or it may suitably be a venturi mixer, an orifice mixer, or the like, suitable for mixing two fluids under flow conditions. Conduit 24 extends from the bottom portion of tank 10 to converter 14 and contains strainer 25, pump 26, valves 8 and 9, and check valve 27. Conduit 6 is provided for the introduction of ammonia to converter 14 and contains strainer 28, check valve 29, control valve 3 and valve 15. Pressure controller 30 is responsive to the pressure in converter 14 and is operatively connected to control valve 3 to shut control valve 3 upon the reaching of a predetermined maximum pressure in converter 14. Line 31 with vent valve 5 is provided for venting air from converter 14. Line 32 communicates converter 14 with the lower portion of tank 10. Line 32 contains control valve 2 and valve 18. Pressure controller 33 is responsive to the pressure in tank 10 and is operatively connected to control valve 2 to shut that valve when the pressure in tank 10 reaches a predetermined maximum pressure. Line 34 communicates line 24 and spray means 17 located in the upper portion of tank 10. Line 34 contains valve 13 and control valve 1. Pressure controller 30 is operatively connected to control valve 1 to open that valve at a predetermined maximum pressure below the pressure at which controller 30 will cause the closing of valve 3. A by-pass line containing valve 16 is provided around control valve 1. Line 35 containing valve 12 communicates lines 32 and 34. Line 36 containing valve 7 communicates with line 24 on the discharge side of pump 26 and is provided for the removal of product aqua ammonia from tank 10. Spray means 17 in the drawing is depicted as a spray ring and directs sprays of liquid against the walls of tank 10. The spray means 17 need not specifically be rings, but the apparatus can be spray nozzles or other suitable spray producing apparatus or even a film producing apparatus so disposed as to produce a film of liquid running down the inside of the tank over substantially the entire surface thereof. The same remarks are applicable to the spray rings 36 which spray water on the outside walls of the tank. Thus, these rings can also be other means to provide a film of running water along the outside of the tank. Water is pumped from 22 through line 37 communicating with the spray means by pump 19. Line 38 is provided for the introduction of make-up cooling water to tank 23 to make up for evaporation losses, etc. If desired, when higher rates of cooling are to be employed than usually employed in the process of the invention line 39 is provided to communicate with a cooling tower or other cooling means to cool the water which is then returned through line 38. Line 40 containing valve 21 communicates with tank 10 and a source of the charge of water to be introduced to tank 10. Line 41 communicates relief valve 4 and the vapor space of tank 10, and is set to open at a pressure slightly higher than the pressure at which control valve 2 is set to close. The relief valve may exhaust to the atmosphere, but is shown in the drawing as preferred connecting with an ammonia recovery means 11 which is a vessel into which water is introduced through line 43 and valve 44 to scrub ammonia in the vapors exhausted through valve 4 and line 42 before the exhaustion of any air or inert gases to the atmosphere through line 45. Line 46 is provided for recovering dilute aqueous ammonia solutions produced.

The operation of the process will be described in connection with a specific example, but the specific quantities, rates, and other conditions of the example are not to be taken as limiting the process of the invention.

To start the unit up, the cooling water pump 19 is started and water is sprayed over the tank 10 through spray rings 36. The total amount of water to be employed in making the batch of aqua ammonia is introduced into the tank through line 40, in this case 6,240 gallons. Valves 5, 8, 9 and 12 are opened; valves 7, 13, 15, 16, 18 and 21 being closed. The pump 26 is then started. All of the air in the converter is then vented through line 31 and valve 5, after which valve 5 is closed. Anhydrous ammonia is then admitted by opening needle valve 15 wide enough to admit a slow stream of anhydrous ammonia into the converter. Preferably, this rate is slow enough so that the material at the outlet of the converter is below its boiling point. Since the water flowing in line 24 contains more and more ammonia as time progresses, needle valve 15 is adjusted as necessary to assure that the solution leaving the converter is below its boiling point. In the present example, the first 900 gallons of anhydrous ammonia are admitted into converter at a rate of 2.0 g.p.m. and the second 900 gallons are admitted at a rate of 1.0 g.p.m. During the period of addition of this first 1800 gallons of anhydrous ammonia, pump 26 is circulating at a rate of 60 g.p.m. The hot aqueous ammonia flowing through lines 32, 35 and then through line 34 to spray means 17 is sprayed against the walls of tank 10 and runs down the side of the tank in indirect heat exchange relationship with the cooled film of water flowing on the outside of the tank and is thus cooled before flowing into the body of liquid in the bottom of the tank. Because the aqueous ammonia from the converter is hotter than the material in the bottom of the tank, much better heat transfer is obtained than if the material from the bottom of the tank was circulated through the sprays, due to the greater difference in temperature differential, as will be understood. However, after the body of liquid in tank 10 has become fairly concentrated in ammonia, in this case after the addition of 1800 gallons of anhydrous ammonia, the flow of hot aqueous ammonia from the converter is switched from the sprays to the bottom of the tank. This is because if the hot aqueous ammonia was continued to be sprayed into the top of the tank near the end of the conversion, the concentration of the material leaving the converter would greatly exceed the average concentration of the tank contents and would also have a much higher temperature. The spraying of this material across the top of the tank under conditions where the heat of conversion is greater than the heat dissipated through the shell of the tank, could result in a false vapor pressure building up in the tank and either would cause the relief valve to pop or would rupture the tank. Thus, flashing of ammonia vapor could take place at any reasonable rates of ammonia addition to the converter and a considerable pressure could be built-up in the vapor space in the tank, particularly when there is a large percentage of air in the tank which will have a tendency to accumulate on the surface of the liquid-vapor interface and thus retard the passage of ammonia vapor into the water and the attainment of equilibrium condtions. Therefore, in the last part of the cycle, circulation for heat exchange through spray means 17 is obtained by pumping liquid from the bottom of the tank up through the sprays. Therefore, in this phase of the operation valve 12 is closed, valve 18 is open, and valve 13 is open, during the addition of the remainder of the ammonia added through valve 15, which is 1,616 gallons to make a 25 weight percent aqueous ammonia solution. During this stage of the operation, the operation of the regulators is as follows. Control valve 2 is a normally opened valve and is sized so that it will pass approximately 60 g.p.m. under the conditions of operation. Pump 26 is sized so that it will pass in excess of 60 g.p.m., in this example, about 100 g.p.m. under the conditions of operation. Pressure controller 30 operates to open control valve 1 when the pressure reaches 30 p.s.i.g. in the converter. Under these conditions, then, approximately 60 g.p.m. flows through valve 9 of line 24 and approximately 40 g.p.m. flows through valve 1 of line 34. Pressure control valve 2 is set to remain open at from 0–3 p.s.i.g. in tank 10 and to close completely at 4 p.s.i.g. in tank 10. Therefore, should the pressure in tank 10 rise to 4 p.si.g., valve 2 will close. Anhydrous ammonia will continue to come into the converter and the pressure will begin to build up. Check valve 27 will prevent flow through line 24 back to tank 10. When the pressure reaches 60 p.s.i.g., pressure controller 30 causes control valve 3 to close and shut off the flow of ammonia. As an added safety feature, should regulator 2 fail to close at 4 p.s.i.g., then pressure relief valve 4 will open and relieve the pressure in tank 10. After the addition of the last 1616 gallons of anhydrous ammonia, valve 16 is opened and valve 9 closed after closing valve 15, and the entire output of pump 26 is circulated through the sprays for a period of time to cool the tank contents to a temperature suitable for handling. After the tank contents is cooled to about 90° F. or lower, this circulation is discontinued. The 9,000 gallons of 25 percent aqua ammonia is now ready for removal as needed through line 24 and 36.

The process and apparatus of the invention is especially suitable for making aqua ammonia containing 15 to 30 weight percent ammonia. Generally, enough ammonia is added to make a 10 to 20 weight percent solution in the first stage of flowing the hot aqua ammonia from the converter to the spray means 17, while the remainder is added to the bottom of the tank to the body of liquid therein. Usually, 15 to 20 weight percent is added in the first stage. The process of the invention is particularly useful for making the usual aqua ammonia solutions containing 18 to 26 weight percent ammonia.

It will be apparent to those skilled in the art that variations and modifications of the invention can be made from a study of the foregoing disclosure. Such variations and modifications are believed to be clearly within the spirit and scope of the invention.

I claim:

1. A liquid ammonia converter and cooling system which comprises in combination a tank, a converter for reacting ammonia and water, a first conduit connecting an inlet of said converter with a lower portion of said tank, a pump in said first conduit adapted to pump from said tank, a second conduit connecting said first conduit at a point intermediate said converter and said pump with a first spray means in the upper portion of said tank, a third conduit connecting an outlet of said converter with the lower portion of said tank, a first valve means in said second conduit, a fourth conduit connecting said third conduit with said second conduit at a point intermediate said first spray means and said first valve means, a second valve means in said fourth conduit, a third valve means in said third conduit intermediate said tank and said fourth conduit, and second spray means arranged to spray against the upper portion of the outside of said tank.

2. A liquid ammonia converter and cooling system which comprises in combination a tank, a converter for reacting ammonia and water, a first conduit connecting an inlet of said converter, with a lower portion of said tank, a pump in said first conduit adapted to pump from said tank, a second conduit connecting said first conduit at a point intermediate said converter and said pump with a first spray means in the upper portion of said tank, a third conduit connecting an outlet of said converter with the lower portion of said tank, a first valve means in said second conduit, a fourth conduit connecting said third conduit with said second conduit at a point intermediate said first spray means and said first valve means, a second valve means in said fourth conduit, a third valve means in said third conduit intermediate said tank and said fourth conduit, and fourth valve means in said second conduit intermediate said first conduit and said first valve means, means responsive to the pressure in said converter operatively connected with said fourth valve means so as to open same upon reaching a first predetermined maximum pressure.

3. A liquid ammonia converter and cooling system which comprises in combination a tank, a converter for reacting ammonia and water, a first conduit connecting an inlet of said converter with a lower portion of said tank, a pump in said first conduit adapted to pump from said tank, a second conduit connecting said first conduit at a point intermediate said converter and said pump with a first spray means in the upper portion of said tank, a third conduit connecting an outlet of said converter with the lower portion of said tank, a first valve means in said second conduit, a fourth conduit connecting said third conduit with said second conduit at a point intermediate said first spray means and said first valve means, a second valve means in said fourth conduit, a third valve means in said third conduit intermediate said tank and said fourth conduit, fourth valve means in said second conduit intermediate said first conduit and said first valve means, means responsive to the pressure in said converter operatively connected with said fourth valve means so as to open same upon reaching a first predetermined maximum pressure, fifth valve means in said third conduit intermediate said converter and said fourth conduit, means responsive to the pressure in the top of said tank operatively connected with said fifth valve means so as to shut same upon reaching a second predetermined maximum pressure, said second predetermined maximum pressure being lower than said first predetermined maximum pressure.

4. Apparatus of claim 3 including a fifth conduit connecting the vapor space of said tank with the atmosphere outside said tank and a relief valve in said fifth conduit set to open and relieve pressure in said tank when said vapor space reaches a third predetermined maximum pressure, said third predetermined maximum pressure being below said first predetermined maximum pressure but above said second predetermined maximum pressure.

5. Apparatus of claim 3 including a conduit means for introducing ammonia to said converter and being connected to said converter, a sixth valve means in said conduit means, means responsive to the pressure in said converter operatively connected with said sixth valve means so as to open same upon reaching a fourth predetermined maximum pressure, said fourth predetermined maximum pressure being higher than said first predetermined maximum pressure.

6. A method for the production of aqua ammonia from ammonia and water which comprises the steps of maintaining a body of water in a first zone having a vapor space above said body, continuously pumping water from said body to a mixing zone; in a first stage, continuously passing a first portion of ammonia to said mixing zone and thereby forming hot aqua ammonia, continuously passing said hot aqua ammonia directly from said mixing zone into said vapor space, passing said hot aqua ammonia as a thin film down a surface defining the periphery of said vapor space and into said body, whereby said body of water thereafter contains absorbed ammonia, passing a film of cool water in indirect heat exchange relationship with said aqua ammonia film and thereby cooling said aqua ammonia film; in a second stage, after all of said first portion of ammonia has been added to said mixing zone and said body of water, continuously passing a second portion of ammonia to said mixing zone and discontinuing flow of said hot aqua ammonia directly to said vapor space and switching said flow of hot aqua ammonia to said body of liquid while simultaneously passing a stream of said body of water containing absorbed ammonia into said vapor space and passing same as a thin film down said surface defining the periphery of said vapor space and into said body, while continuing to pass a film of cool water in indirect heat exchange relationship with said film of water containing absorbed ammonia, thereby cooling the latter; continuing said second stage of operation until all of said second portion of ammonia has been added to said mixing zone and said tank.

7. Process of claim 6 wherein after completion of said stage of operation and the flow of ammonia to said mixing zone is discontinued, the flow of said stream of said body of water containing absorbed ammonia to said vapor space in indirect heat exchange relationship with said film of cool water is continued for a time sufficient to cool said body to a predetermined temperature.

8. Process of claim 6 wherein said first zone is maintained at a lower temperature and pressure than said mixing zone during flow of ammonia into said mixing zone.

9. Process of claim 6 wherein enough ammonia is added to said body of water to produce aqua ammonia containing 15 to 30 weight percent ammonia, and wherein said first portion of ammonia is sufficient to produce 10 to 20 weight percent aqua ammonia when mixed with said body of water.

10. Process of claim 6 wherein enough ammonia is added to said body of water to produce aqua ammonia containing 18 to 26 weight percent ammonia, and wherein said first portion of ammonia is sufficient to produce 15 to 20 weight percent aqua ammonia when mixed with said body of water.

11. Mixing a stream of water from a body of water in a tank in a zone with ammonia, said tank having a vapor space above said body of water; in a first stage, flowing the resulting hot aqua ammonia from said zone directly into the vapor space of said tank and down its wall in a film in indirect heat exchange with a film of cool water on the outside wall of said tank into said body of water to form a body of aqua ammonia; in a second stage, switching the flow of said hot aqua ammonia directly into said body of aqua ammonia while simultaneously flowing a stream of said aqua ammonia from said body into said vapor space and down said wall in a film in indirect heat exchange with said film of cool water, thereby cooling the contents of said tank and avoiding excessive vapor pressures therein.

References Cited in the file of this patent
UNITED STATES PATENTS

| | | |
|---|---|---|
| 1,885,012 | Harvey | Oct. 25, 1932 |

FOREIGN PATENTS

| | | |
|---|---|---|
| 359,313 | Great Britain | Oct. 22, 1931 |